(12) United States Patent
Yamano

(10) Patent No.: US 9,134,933 B2
(45) Date of Patent: Sep. 15, 2015

(54) INFORMATION PROCESSING APPARATUS CAPABLE OF PRINTING FILE ATTACHED TO ELECTRONIC MAIL, CONTROL METHOD THEREFOR, AND STORAGE MEDIUM

(75) Inventor: Hiroshi Yamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/559,754

(22) Filed: Jul. 27, 2012

(65) Prior Publication Data

US 2013/0057887 A1    Mar. 7, 2013

(30) Foreign Application Priority Data

Sep. 2, 2011    (JP) .................................. 2011-191613

(51) Int. Cl.
*G06F 3/12* (2006.01)
(52) U.S. Cl.
CPC ............ *G06F 3/1206* (2013.01); *G06F 3/1244* (2013.01); *G06F 3/1288* (2013.01); *G06F 3/1292* (2013.01)
(58) Field of Classification Search
None
See application file for complete search history.

(56) References Cited

U.S. PATENT DOCUMENTS

| | | | | |
|---|---|---|---|---|
| 2005/0012951 A1* | 1/2005 | Madril et al. | ................. | 358/1.13 |
| 2005/0105135 A1* | 5/2005 | Takahashi | .................... | 358/1.18 |
| 2005/0270553 A1* | 12/2005 | Kawara | ........................ | 358/1.13 |
| 2005/0270569 A1* | 12/2005 | Hayashi | ........................ | 358/1.15 |
| 2006/0238799 A1* | 10/2006 | Kidokoro | ..................... | 358/1.15 |
| 2007/0177203 A1* | 8/2007 | Kamasuka et al. | .......... | 358/1.15 |
| 2008/0049245 A1* | 2/2008 | Kamasuka et al. | .......... | 358/1.15 |
| 2008/0068646 A1* | 3/2008 | Kobayashi | .................... | 358/1.15 |
| 2012/0250076 A1* | 10/2012 | Kumar et al. | ................. | 358/1.15 |

FOREIGN PATENT DOCUMENTS

| | | | |
|---|---|---|---|
| JP | 2000-332814 A | 11/2000 | |
| JP | 2004-104346 A | 4/2004 | |
| JP | 2004-220606 | 8/2004 | |
| JP | 2004220606 A * | 8/2004 | ............. G06F 13/00 |
| JP | 2005-071272 A | 3/2005 | |
| JP | 2005-352584 A | 12/2005 | |

OTHER PUBLICATIONS

Japanese Office Action issued in corresponding application No. 2011-191613 on Jun. 30, 2015.

* cited by examiner

*Primary Examiner* — Hilina K Demeter
(74) *Attorney, Agent, or Firm* — Carter, DeLuca, Farrell & Schmidt, LLP

(57) ABSTRACT

An information processing apparatus which is capable of printing a file attached to an e-mail using an existing printing apparatus. An electronic mail with a file attached thereto is received. With respect to each of printing apparatuses, a printer driver used in the printing apparatus and an identifier that identifies the printing apparatus are stored in association with each other in a storage unit. Based on the stored information, a printer driver corresponding to an identifier that identifies a printing apparatus entered in the received electronic mail is identified as a printer driver to be used. Print data is generated from the file attached to the received electronic mail using the identified printer driver. The generated print data is sent to the identified printing apparatus.

14 Claims, 9 Drawing Sheets

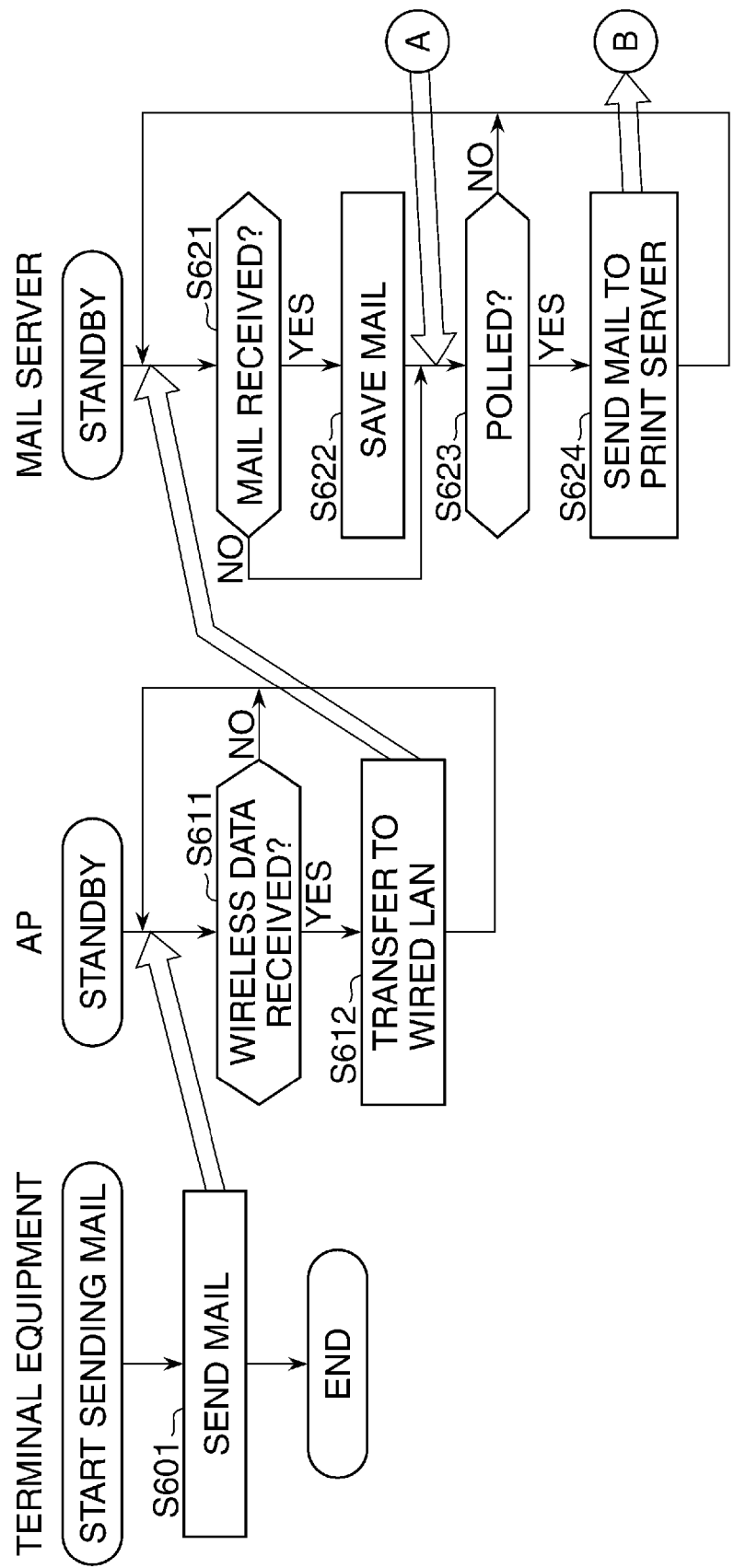

FIG.9

| No. | EXTENSION | FILE TYPE | APPLICATION NAME |
|---|---|---|---|
| 1 | pdf | pdf doc | PDF SOFTWARE |
| 2 | jpg | IMAGE | JPEG SOFTWARE |
| 3 | htm,html | HTML doc | HTML SOFTWARE |
| 4 | txt | Text doc | TEXT EDITING SOFTWARE |

FIG.10

| PRINTER DRIVER | PRINTER NAME |
|---|---|
| LBP100 | 100 |
| LBP200 | 200 |
| LBP300 | 300 |
| ⋮ | ⋮ |
| LBP800 | 800 |
| LBP900 | 900 |

INFORMATION PROCESSING APPARATUS CAPABLE OF PRINTING FILE ATTACHED TO ELECTRONIC MAIL, CONTROL METHOD THEREFOR, AND STORAGE MEDIUM

BACKGROUND OF THE INVENTION

1. Field of the Invention

The present invention relates to an information processing apparatus, a control method therefor, and a computer-readable storage medium storing a control program for implementing the method, and in particular to a printing system for use in printing a file attached to an electronic mail (e-mail).

2. Description of the Related Art

Conventionally, as an example of methods to perform printing using printing apparatuses (also referred to as printers) from terminal equipment, there has been a method that installs printer drivers, which are special software supporting the respective printing apparatuses, on terminal equipment, and sends print data to the printing apparatuses using the printer drivers. Also, as an example of methods to perform printing without using printer drivers, there has been a method that uses e-mail software provided in terminal equipment, attaches a file desired to be printed to an e-mail, and sends the e-mail to a printing apparatus (see Japanese Laid-Open Patent Publication (Kokai) No. 2004-220606). The latter method is particularly useful when it is used for mobile terminal equipment or the like on which it is difficult to install a printer driver.

According to the method described in Japanese Laid-Open Patent Publication (Kokai) No. 2004-220606, an e-mail address is assigned to a printer in advance, a file to be printed is attached to an e-mail for which the e-mail address is designated as a destination, the e-mail with the file attached thereto is sent, and the printer performs printing according to the attached file.

Specifically, at the time of initialization, the printer requests an e-mail address from a server apparatus (hereafter referred to merely as the server), and a unique e-mail address is assigned to the printer from the server. A user sends, from mobile terminal equipment, an e-mail with a file desired to be printed attached thereto to the e-mail address assigned to the printer.

A table in which printers and e-mail addresses are associated with each other is recorded is held in the server, and upon receiving an e-mail, the server refers to the table to identify a printer to which the received e-mail should be sent.

Namely, the printer described in Japanese Laid-Open Patent Publication (Kokai) No. 2004-220606 has to be equipped with a function of requesting an e-mail address from the server. Further, the printer described in Japanese Laid-Open Patent Publication (Kokai) No. 2004-220606 has to be equipped with a table and a function of referring to the table and sending an e-mail to the printer.

As described, according to Japanese Laid-Open Patent Publication (Kokai) No. 2004-220606, the printers have to be equipped with at least a function of requesting an e-mail address from the server. Moreover, the server has to be equipped with at least a function of managing a table in which e-mail addresses and the printers are associated with each other.

Thus, there has conventionally been the problem that when printing a file attached to an e-mail, it is necessary to equip a printer and a server with special functions, and when printing a file attached to an e-mail, it is impossible to use an existing printer.

SUMMARY OF THE INVENTION

The present invention provides an information processing apparatus capable of printing a file attached to an e-mail using an existing printing apparatus, a control method therefor, and a computer-readable storage medium storing a control program for implementing the method.

Accordingly, a first aspect of the present invention provides an information processing apparatus capable of being connected to at least one printing apparatus, comprising a receiving unit configured to receive an electronic mail with a file attached thereto, a storage unit configured to, with respect to each of the at least one printing apparatus, store a printer driver used in the at least one printing apparatus and an identifier that identifies the at least one printing apparatus in association with each other, an identifying unit configured to, based on information stored in the storage unit, identify as a printer driver to be used a printer driver corresponding to an identifier that identifies a printing apparatus entered in an electronic mail received by the receiving unit, a generation unit configured to generate print data from a file attached to the received electronic mail using the printer driver identified by the identifying unit, and a sending unit configured to send the print data generated by the generation unit to the printing apparatus identified by the identifier entered in the received electronic mail.

Accordingly, a second aspect of the present invention provides a control method for an information processing apparatus capable of being connected to at least one printing apparatus, comprising a receiving step of receiving an electronic mail with a file attached thereto, a storage step of, with respect to each of the at least one printing apparatus, storing a printer driver used in the at least one printing apparatus and an identifier that identifies the at least one printing apparatus in association with each other in a memory, an identifying step of, based on information stored in the memory, identifying as a printer driver to be used a printer driver corresponding to an identifier that identifies a printing apparatus entered in an electronic mail received in the receiving step, a generation step of generating print data from a file attached to the received electronic mail using the printer driver identified in the identifying step, and a sending step of sending the print data generated in the generation step to the printing apparatus identified by the identifier entered in the received electronic mail.

Accordingly, a third aspect of the present invention provides a non-transitory computer-readable storage medium storing a control program for implementing a control method for an information processing apparatus capable of being connected to at least one printing apparatus, the control method comprising a receiving step of receiving an electronic mail with a file attached thereto, a storage step of, with respect to each of the at least one printing apparatus, storing a printer driver used in the at least one printing apparatus and an identifier that identifies the at least one printing apparatus in association with each other in a memory, an identifying step of, based on information stored in the memory, identifying as a printer driver to be used a printer driver corresponding to an identifier that identifies a printing apparatus entered in an electronic mail received in the receiving step, a generation step of generating print data from a file attached to the received electronic mail using the printer driver identified in the identifying step, and a sending step of sending the print data generated in the generation step to the printing apparatus identified by the identifier entered in the received electronic mail.

According to the present invention, a file attached to an e-mail can be printed using an existing printing apparatus.

Further features of the present invention will become apparent from the following description of exemplary embodiments (with reference to the attached drawings).

BRIEF DESCRIPTION OF THE DRAWINGS

FIGS. 6A and 6B are flowcharts useful in explaining an operation from sending of an e-mail by mobile terminal equipment appearing in FIG. 1 to printing of an attached file by the printer.

FIG. 9 is a view showing a table in which the correspondence relationship between attached file extensions and applications is recorded.

FIG. 10 is a view showing a table in which the correspondence relationship between printer drivers and e-mail subjects is recorded.

DESCRIPTION OF THE EMBODIMENTS

A description will now be given of an exemplary printing system using a server apparatus according to an embodiment of the present invention with reference to the drawings.

Figure 1:
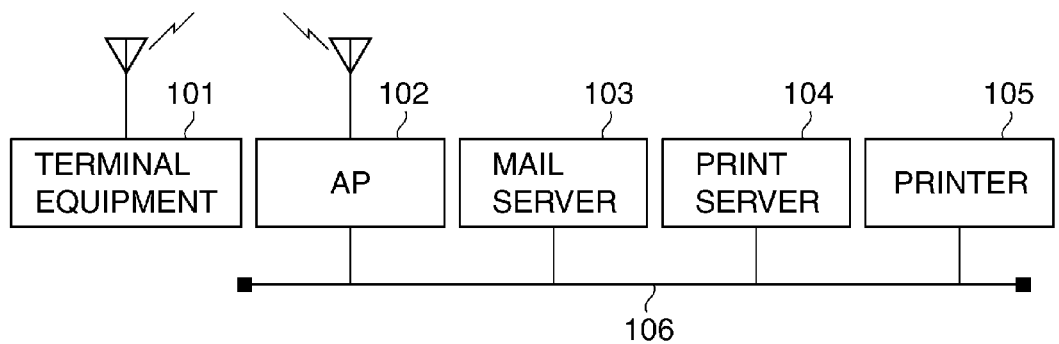
FIG. 1 is a block diagram schematically showing an exemplary printing system using a server apparatus according to an embodiment of the present invention.

FIG. 1 is a block diagram schematically showing an exemplary printing system using the server apparatus according to the embodiment of the present invention.

In the printing system shown in the figure, a wireless access point (AP) 102, a mail server 103, a print server 104, and a printing apparatus (printer) 105 are connected together by a wired LAN (local area network) 106. Namely, the mail server 103 and the print server 104 can be connected together by the wired LAN 106. Here, the mail server 103 and the print server 104 are server apparatuses. The AP 102 is connected to terminal equipment 101 such as mobile terminal equipment by a wireless line. It should be noted that in the example shown in FIG. 1, there is only one printer 105 for the convenience of explanation, but actually, a plurality of printers are connected to the LAN 106.

The terminal equipment 101 is, for example, of a portable size and equipped with an operation system (OS). On the OS, various application software (hereafter referred to as applications) operate. One of the applications is electronic mail (e-mail) software, and the terminal equipment 101 sends e-mails by the e-mail software using wireless communication.

The terminal equipment 101 is connected to the printing system via the AP 102. Mail server software is installed on the mail server 103, and e-mails sent from the terminal equipment 101 are held in the mail server 103. Printer driver software supporting the printer 105 connected to the LAN 106 is installed on the print server 104. Upon receiving print data sent from the print server 104, the printer 105 performs printing according to the print data.

Figure 2:
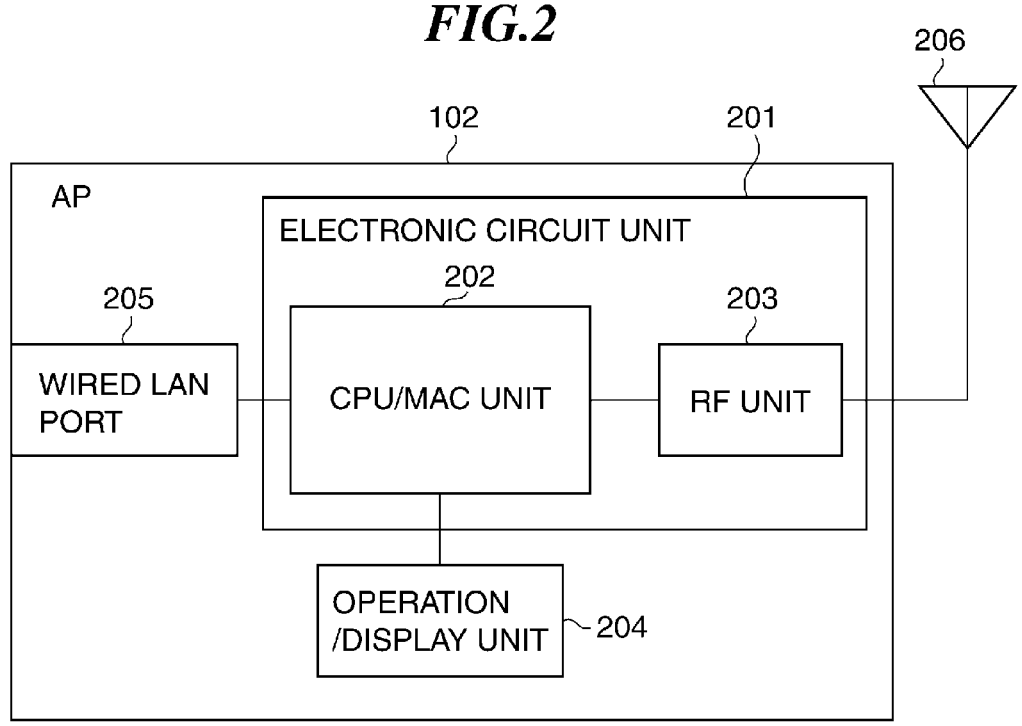
FIG. 2 is a block diagram schematically showing an exemplary arrangement of an AP (wireless access point) appearing in FIG. 1.

FIG. 2 is a block diagram schematically showing an exemplary arrangement of the AP 102 appearing in FIG. 1.

Referring to FIG. 2, the AP 102 has an electronic circuit unit 201, an operation/display unit 204, and a wired LAN port 205. The wired LAN port 205 is equipped with a connector (not shown) which is connected to the LAN 106, and the AP 102 is connected to the LAN 106 by the wired LAN port 205.

The operation/display unit 204 has, for example, an LED and switches, and displays the status of the AP 102 and the statuses of respective ports. It should be noted that the operation/display unit 204 is also equipped with, for example, a switch for connection to a wireless line (for example, a wireless LAN), and further equipped with a security function for safely connecting to the wireless line.

The electronic circuit unit 201 has a CPU/MAC unit 202 and a radio frequency (RF) transmitting and receiving unit (hereafter also referred to merely as the RF unit) 203. The CPU/MAC unit 202 has a CPU and a MAC (media access control) (both are not shown). The CPU has devices such as a processor and a memory, and these devices are connected together by an internal bus (not shown). The MAC has a radio communication unit and a wired communication unit (both are not shown).

An antenna 206 for transmitting and receiving radio waves is connected to the RF transmitting and receiving unit 203. As shown in the figure, the CPU/MAC unit 202 is connected to the operation/display unit 204, the RF transmitting and receiving unit 203, and the wired LAN port 205. As described earlier, the AP 102 is connected to the wired LAN 106 via an Ethernet (registered trademark) cable. The Ethernet (registered trademark) cable has one end thereof connected to the wired LAN port 205 and the other end thereof connected to a network hub (not shown).

Figure 3:
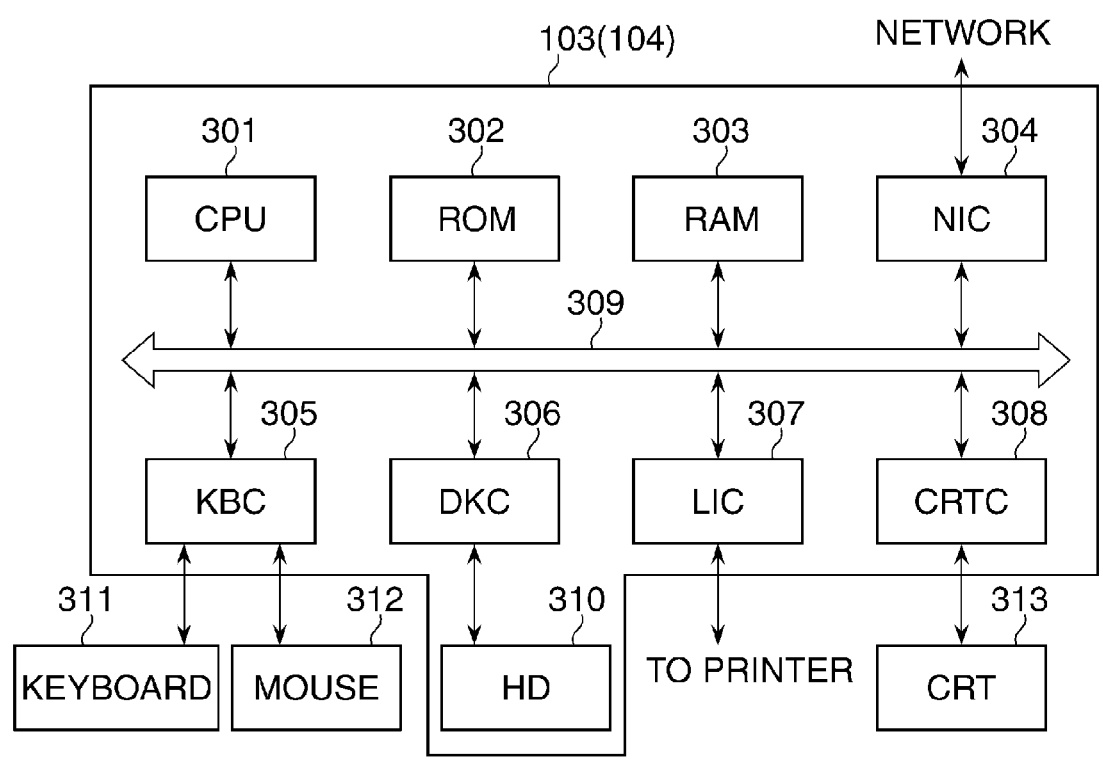
FIG. 3 is a block diagram schematically showing respective hardware arrangements of a mail server and a print server appearing in FIG. 1.

FIG. 3 is a block diagram schematically showing respective hardware arrangements of the mail server 103 and the print server 104 appearing in FIG. 1. It should be noted that the mail server 103 and the print server 104 have the same arrangement, and therefore, the mail server 103 and the print server 104 will hereafter be referred to as the server collectively.

The server, which is, for example, an information processing apparatus such as a PC, has a CPU 301, a ROM 302, a RAM 303, and a network interface controller (NIC) 304. The CPU 301, the ROM 302, the RAM 303, and the NIC 304 are connected together by an internal bus 309. Further, in the example shown in the figure, a keyboard controller (KBC) 305, a disk controller (DKC) 306, a local interface controller (LIC) 307, and a CRT controller (CRTC) 308 are connected to the internal bus 309. An Ethernet (registered trademark) cable is connected to the NIC 304 shown in the figure.

A keyboard 311 and a mouse 312 are connected to the KBC 305. A hard disk (HD) 310 is connected to the DKC 306. Peripheral equipment is connected to the LIC 307 via a local interface such as a USB. A CRT display 313 is connected to the CRTC 308.

A basic I/O (input-output) program, an OS (operation system), and so on are stored in the ROM 302. The CPU 301 executes the OS to manage and execute application programs.

It should be noted that in the print server 104, mobile terminal printing applications, various application programs, and printer drivers, to be described later, are stored in the HD 310. The print server 104 also has a mail client function and a printer control function and performs printing of files attached to mails using these functions. A mail server function of the mail server 103 will be described later.

Figure 4:
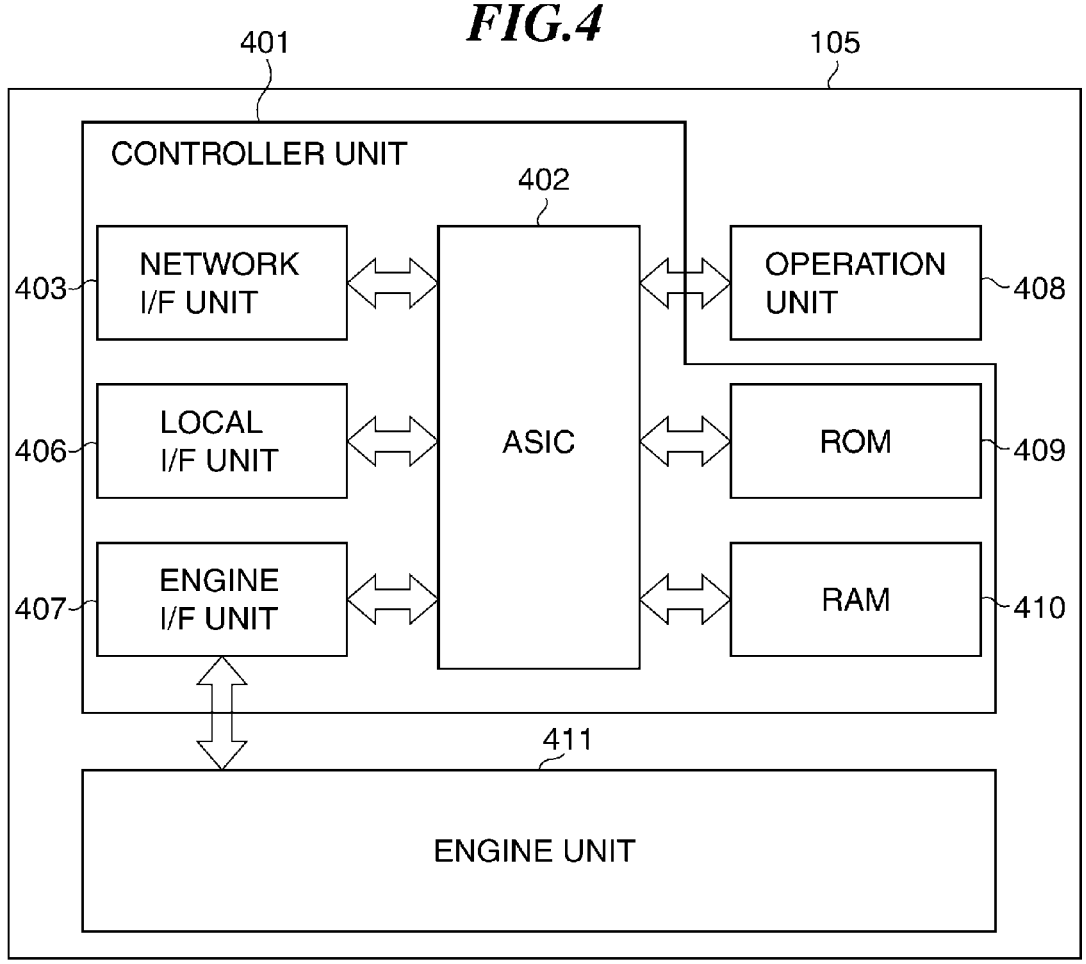
FIG. 4 is a block diagram schematically showing an exemplary arrangement of a printer appearing in FIG. 1.

FIG. 4 is a block diagram schematically showing an exemplary arrangement of the printer 105 appearing in FIG. 1.

Referring to FIG. 4, the printer 105 has a controller unit 401 and an engine unit 411. The controller unit 401 has an ASIC (application specific integrated circuit) 402, a network interface (I/F) unit 403, a local I/F unit 406, an engine I/F unit 407, a ROM 409, and a RAM 410. An operation unit 408 is connected to the ASIC 402.

The ASIC 402 has a CPU, and upon receiving print data from the print server 104 via the network I/F unit 403, the ASIC 402 subjects the print data to predetermined processing and then sends the print data to the engine unit 411 via the engine I/F unit 407. According to the print data, the engine unit 411 forms (prints) an image on a sheet using an electrophotographic process and outputs the sheet. It should be noted that the ASIC 402 may also receive print data from the local I/F unit 406.

The local I/F unit 406 is, for example, a USB port.

The operation unit 408 notifies a user of printer status conditions and receives various operational instructions input from the user. Various programs to be executed by the CPU of the ASIC 402 are stored in the ROM 409. The RAM 410 is used as a print data expansion area and a work area when the ASIC 402 processes print data.

Figure 5:
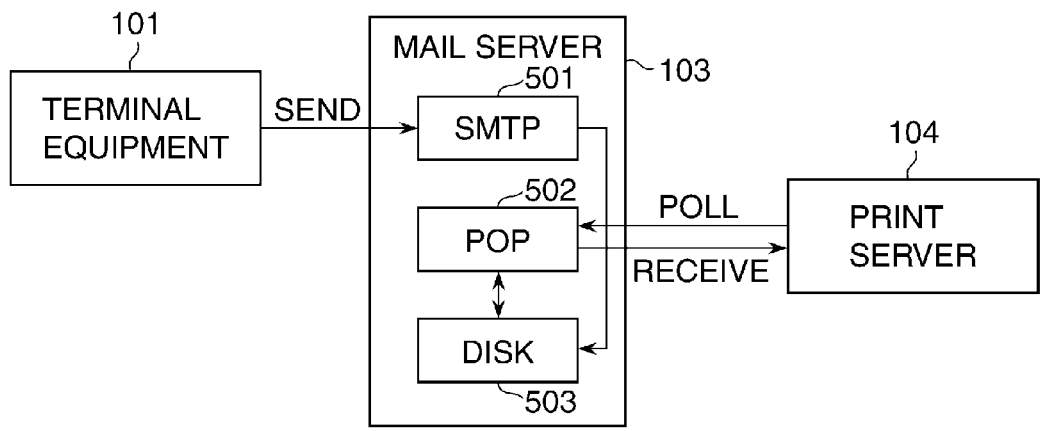
FIG. 5 is a diagram useful in explaining electronic mail (e-mail) transmission and reception by the mail server appearing in FIG. 1.

FIG. 5 is a diagram useful in explaining electronic mail (e-mail) transmission and reception by the mail server 103 appearing in FIG. 1.

Referring to FIG. 5, the mail server 103 has an SMPT (simple mail transfer protocol) server 501 and a POP (post office protocol) server 502.

In sending an e-mail using e-mail software, the mobile terminal equipment 101 designates a mail address (destination) of the mail server 103 determined in advance. This e-mail is received by the mail server 103 via the AP 102 (FIG. 1). For example, when the mail address of the mail server 103 is "USER@mailprint.xx.jp", this mail address is designated. In response to the SMTP server 501 receiving the e-mail, the mail server 103 stores the e-mail in a hard disk (DISK) 503 and brings the receiving operation to an end.

The print server 104 causes a mobile cooperative printing application, to be described later, to poll the POP server 502 at predetermined intervals to ascertain whether or not an e-mail has been received. On this occasion, the print server 104 designates a mail address of the mail server 103 described earlier. It should be noted that the polling interval can be arbitrarily set by the mobile cooperative printing application.

When polled by the print server 104, the POP server 502 requests a user name and a password from the print server 104. In response to this, the print server 104 sends a user name and a password to the mail server 103. A user name and a password are registered in the mail server 103 in advance. Upon authenticating the user name and password sent from the print server 104, the POP server 502 checks received e-mails stored in the hard disk (DISK) 503. Then, the POP server 502 ascertains whether or not there is any e-mail addressed to the print server 104 and sends a reply to this effect to the print server 104. When any e-mail addressed to the print server 104 is stored in the hard disk (DISK) 503, the POP server 502 passes the e-mail to the print server 104 and brings the operation to an end.

Figure 6B:
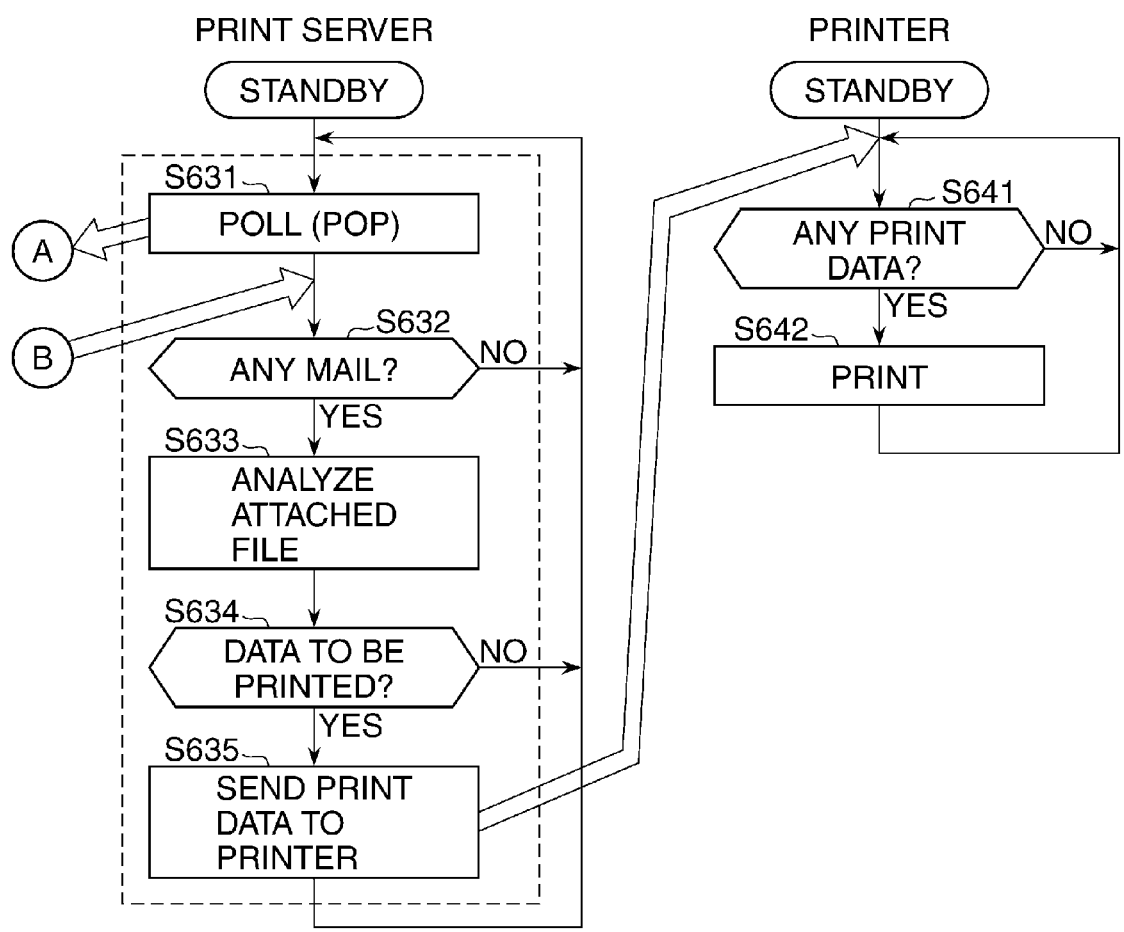

FIGS. 6A and 6B are flowcharts useful in explaining an operation from sending of an e-mail by the mobile terminal equipment 101 appearing in FIG. 1 to printing of an attached file by the printer 105. Steps in the flowcharts are executed by CPUs of devices (terminal equipment, AP, mail server, print server, and printer), which carry out respective flows, executing programs stored in memories such as a ROM and an HD.

Referring to FIGS. 1, 6A, and 6B, here, a description will be given of a case where the mobile terminal equipment 101 prints a file (print data) attached to an e-mail using the printer 105. When the user instructs transmission of an e-mail with a file desired to be printed attached thereto using e-mail software which the mobile terminal equipment 101 has, the mobile terminal equipment 101 sends the e-mail (step S601). When the sending of the e-mail is completed, the e-mail software finishes operation.

Figure 7:
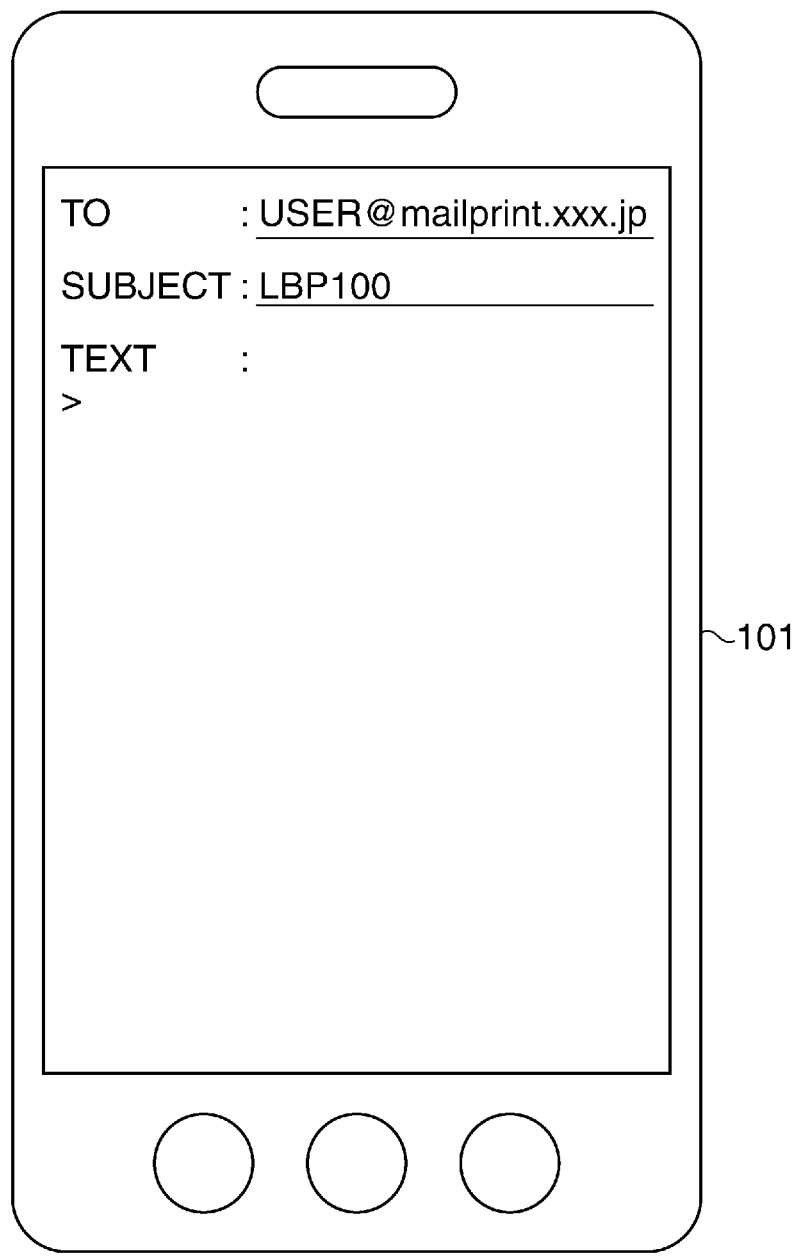
FIG. 7 is a view showing a send screen of e-mail software in the mobile terminal equipment appearing in FIG. 1.

FIG. 7 is a view showing a send screen of e-mail software which the mobile terminal equipment 101 appearing in FIG. 1 has. At the time of sending an e-mail with a file attached thereto, the user enters, for example, "USER@mailprint.xx.jp" in an address field. Then, the user enters, for example, "LBP100" in a subject line. A printer name of a printer desired to be used is entered in this subject line. It should be noted that a printer name may be written in a text of an e-mail.

The AP 102 is on standby and determines whether or not an e-mail has been received as wireless data (step S611). When no wireless data has been received (NO in the step S611), the AP 102 stands by. When an e-mail has been received as wireless data from the mobile terminal equipment 101 via a wireless LAN (YES in the step S611), the AP 102 causes the RF unit 203 to convert the wireless data into a digital signal. Then, the CPU/MAC unit 202 analyzes a destination and a route from the digital signal and transfers the digital signal onto the wired LAN 106 via the wired LAN port 205 (step S602). Here, the AP 102 sends the digital signal (hereafter referred to as the e-mail) to the mail server 103 (the SMTP server 501 shown in FIG. 5).

The mail server 103 monitors whether or not an e-mail has been received (step S621). When no e-mail has been received (NO in the step S621), the mail server 103 stands by. On the other hand, when an e-mail has been received (YES in the step S621), the mail server 103 stores the e-mail with an attached file in the hard disk 503 as described earlier (step S622).

As described earlier, the print server 104 polls the POP server 502 of the mail server 103 at predetermined intervals. The mail server 103 monitors whether or not it has been polled (step S623). When the POP server 502 of the mail server 103 has not been polled (NO in the step S623), the mail server 103 returns to the process in the step S621.

When the POP server 502 of the mail server 103 has been polled (YES in the step S623), the mail server 103 sends the corresponding e-mail and attached file to the print server 104 (step S624). Then, the mail server 103 returns to the process in the step S621.

The print server 104 polls the mail server 103 at predetermined intervals (step S631). Then, as described with reference to FIG. 5, the print server 104 determines whether or not it has received a notification to the effect that there is an e-mail from the mail server 103 (step S632). Upon receiving a notification to the effect that there is no e-mail (NO in the step S632), the print server 104 returns to the process in the step S631.

On the other hand, upon receiving a notification to the effect that there is an e-mail (YES in the step S632), the print server 104 receives the e-mail from the mail server 103 and analyzes a file attached thereto (step S633). Based on the analysis result, the print server 104 determines whether or not the attached file is print data (step S624).

When the attached file is not print data (NO in the step S634), the print server 104 returns to the process in the step S631. On the other hand, when the attached file is print data (YES in the step S634), the print server 104 sends the attached file as print data to the printer 105 (step S635). Then, the print server 104 returns to the process in the step S631.

Here, data to be handled is referred to as an "attached file" before the print server 104 analyzes the file. After the print server 104 analyzes the file, data expanded into data to be printed is referred to as "print data". Namely, the print server 104 generates print data according to an attached file. The processes in the steps S631 to S635 enclosed by a broken line in FIG. 6B will be described later in detail.

The printer 105 monitors whether or not print data has been received from the print server 104 (step S641). When no print data has been received (NO in the step S641), the printer 105 stands by. On the other hand, when print data has been received (YES in the step S641), the printer 105 performs printing in the manner described earlier (step S642) and returns to the process in the step S641.

A detailed description will now be given of a process carried out by the print server 104 appearing in FIG. 1.

Figure 8:
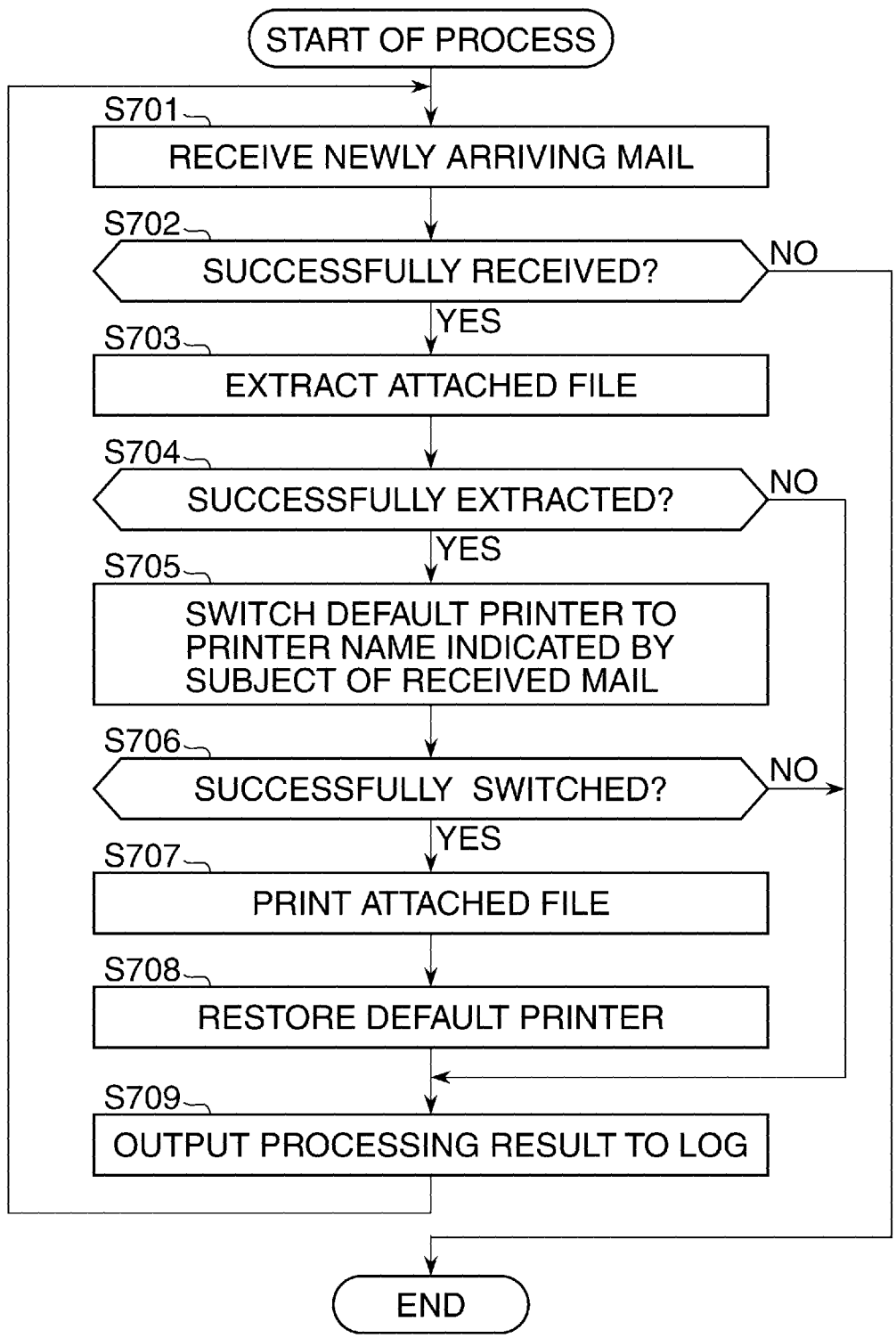
FIG. 8 is a flowchart useful in explaining in detail a process carried out by the printer server.

FIG. 8 is a flowchart useful in explaining in detail the process carried out by the printer server 104. Steps in FIG. 8 are carried out by a CPU of the print server executing programs stored in a ROM and an HD.

When the print server 104 has received an e-mail from the mail server 103 (step S701), the CPU 301 determines whether or not the e-mail has successfully been received (step S702). When the e-mail has not successfully been received (NO in the step S702), the CPU 301 brings this process to an end.

When the e-mail has successfully been received (YES in the step S702), the CPU 301 extracts an attached file attached to the e-mail (step S703). The CPU 301 then determines whether or not the attached file has successfully been extracted (step S704). When the attached file has successfully been extracted (YES in the step S704), the CPU 301 controls the DKC 306 via the internal bus 309 to store the attached file in the HD 310.

The CPU 301 then carries out a process in which it switches a default printer setting to a "printer name" entered in a subject line of the received e-mail (step S705). The CPU 301 then determines whether or not the default printer setting has successfully been switched (step S706). When the default printer setting has successfully being switched (YES in the step S706), the CPU 301 performs printing of the attached file in a manner described hereafter (step S707).

First, the CPU 301 checks an extension of the attached file and starts an application corresponding to the extension. It should be noted that a plurality of applications are stored in the HD 310, and the CPU 301 reads an application corresponding to the extension of the attached file from the HD 310. The CPU 301 executes the application and uses its printing function.

FIG. 9 is a view showing an exemplary table in which the correspondence relationship between attached file extensions and applications is recorded. The table shown in the figure is stored in, for example, the HD 310 (storage unit) in advance.

In the example shown in FIG. 9, extensions are "pdf", "jpg", "htm, html", and "txt", and file types and application names are associated with the respective extensions. Assuming now that the extension is "pdf", the CPU 301 refers to this table (application table) and obtains "pdf software" as an application name. The CPU 301 then starts pdf software stored in the HD 310 as a printing application.

Further, the CPU 301 starts a printer driver associated with the printer name of an output destination obtained in the step S705 and expands print data which is the attached file into the RAM 303. The CPU 301 then performs printing according to the print data using a printer specified in the subject line of the e-mail.

FIG. 10 is a view showing an exemplary table in which the correspondence relationship between printer drivers and e-mail subjects is recorded. This table is stored in, for example, the HD 310 (storage unit) in advance.

In the example shown in FIG. 10, printer drivers "LBP100" to "LBP900" are associated with respective printer names "100" to "900". Referring to the table (driver table) shown in FIG. 10, the CPU 301 starts a printer driver corresponding to a printer name. It should be noted that printer names are just exemplary identifiers of printers, and any other information such as IP addresses may be used as long as the information can identify printers. In this case, in the table shown in FIG. 10, information such as IP addresses is managed in association with printer driver.

In the above described manner, the print server 104 starts an application corresponding to an extension, uses a printing function of this application, and further starts a printer driver corresponding to a printer name to perform printing. Here, the print server 104 controls the printer 105 to perform printing. Thus, even when a printer has no special functions like those of the above described prior art, the printer can print a file attached to an e-mail.

It should be noted that when a printer is newly connected to the wired LAN 106 (FIG. 1), the CPU 301 obtains a printer name and a printer driver of this printer and adds them to the driver table. Likewise, when a printer is connected to the LIC 307 shown in FIG. 3, the CPU 301 obtains a printer name and a printer driver of this printer and adds them to the driver table.

When printing of the attached file, that is, printing of the print data is completed, the CPU 301 restores the default printer setting (step S708). Then, the CPU 301 controls the CRTC 308 to display a processing result log after the completion of printing on the CRT 313. Further, the CPU 301 stores this processing result log in the HD 310. The CPU 301 returns to the process in the step S701.

In the step S704, when the attached file has not successfully been extracted from the e-mail (NO in the step S704), the CPU 301 proceeds to step S709 in which it displays a processing result log indicative of the unsuccessful extraction on the CRT 131 and stores this processing result log in the HD 310. This processing result log can be used for troubleshooting by the user.

Likewise, when the default printer setting has not successfully been switched (NO in the step S706), the CPU 301 proceeds to the process in the step S709 in which it displays a processing result log indicative of the unsuccessful switching on the CRT 131 and stores this processing result log in the HD 310.

Figure 11:
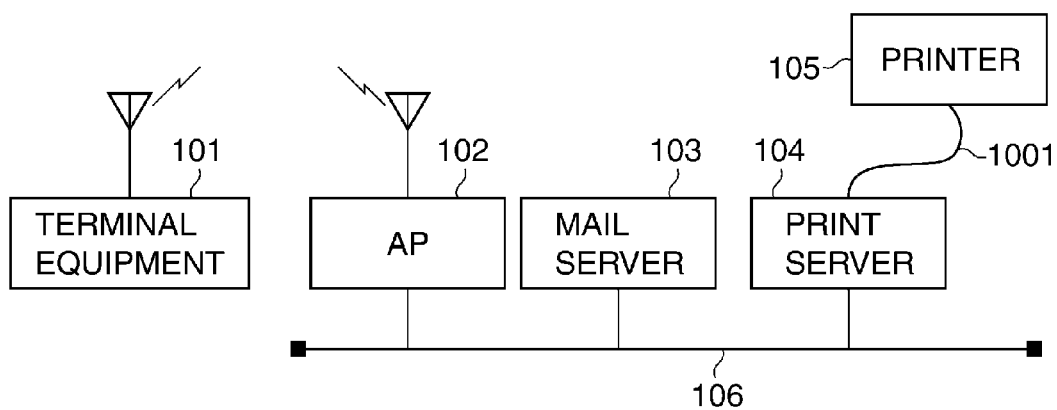
FIG. 11 is a block diagram schematically showing another exemplary form in which the printer and the print server appearing in FIG. 1 are connected together.

FIG. 11 is a block diagram schematically showing another exemplary form in which the printer 105 and the print server 104 appearing in FIG. 1 are connected together.

Although in the example shown in FIG. 1, the printer 105 is connected to the wired LAN 106, the printer 105 and the print server 104 may be connected together by a USB cable 1001 as shown in FIG. 11. In this case, the printer 105 is connected to the print server 104 by the LIC 307 shown in FIG. 3.

The connection shown in FIG. 11 enables printing to be performed by connecting the printer 105 and the print server 104 together even if the printer 105 is equipped with only a local interface. It should be noted that in the example shown in FIG. 11 as well, printing is performed in the manner described with reference to FIG. 8.

Figure 12:
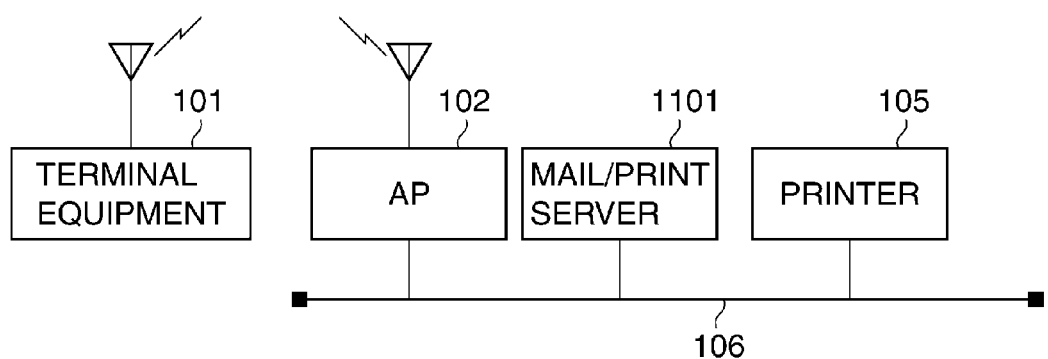
FIG. 12 is a block diagram schematically showing another example of the mail server and the print server appearing in FIG. 1.

FIG. 12 is a block diagram schematically showing another example of the mail server 103 and the print server 104 appearing in FIG. 1.

Although in the example shown in FIG. 1, the printer 105 and the print server 104 are connected to the wired LAN 106, the printer 105 and the print server 104 may be configured as one PC to serve as a mail/print server 1101. Namely, a mail server function and a print server function can be implemented by software operations, and hence one server apparatus may be equipped with the mail server function and the print server function. This can reduce hardware resources. It should be noted that in the example shown in FIG. 12 as well, printing is performed in the manner described with reference to FIG. 8.

Although in the embodiment described above, the mobile terminal equipment 101 sends an e-mail using a wireless LAN, it may send an e-mail using a wireless line such as a cellular phone line. Further, even when a plurality of attached files are attached to an e-mail, printing is performed in the same manner.

Thus, according to the embodiment described above, because the print server has the applications for the printing function and the printer drivers and performs printing according to the format of an attached file and the driver of a printer to be used for printing, an attached file sent from the mobile terminal equipment can be printed irrespective of printer configurations.

Further, even when a printer is newly added, it is only necessary to recognize a printer name of this printer and select an application and a printer driver appropriate to the printer, and as a result, burdens on the user can be reduced.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-191613 filed Sep. 2, 2011, which is hereby incorporated by reference herein in its entirety.

What is claimed is:

1. An information processing apparatus capable of communicating with each of plural printing apparatuses, comprising:
    a receiving unit configured to receive an electronic mail with a file attached thereto, the electronic mail having at least one of respective identifiers of the plural printing apparatuses entered therein;
    a storage unit configured to store a corresponding table in which the identifiers of the plural printing apparatuses are included, each of the identifiers of the plural printing apparatuses in the corresponding table being usable for identifying each of printer drivers for the plural printing apparatuses;
    an identifying unit configured to, based on both the corresponding table stored in the storage unit and the identifier entered in the received electronic mail, identify a printer driver to be used;
    a generation unit configured to generate print data from a file attached to the received electronic mail using the printer driver identified by the identifying unit;
    a sending unit configured to send the print data generated by the generation unit to the printing apparatus identified based on the identifier entered in the received electronic mail; and
    an additional unit configured to obtain an identifier of a new printing apparatus different from the plural printing apparatuses and add the obtained identifier to the corresponding table for enabling the new printing apparatus to print a file attached to an electronic mail.

2. An information processing apparatus according to claim 1, further comprising a starting unit configured to start an application corresponding to an extension of the file attached to the received electronic mail, wherein based on the file processed using the application started by the starting unit, the generation unit generates the print data.

3. An information processing apparatus according to claim 1, wherein the identifier that identifies the printing apparatus is described in a subject line of the received electronic mail.

4. An information processing apparatus according to claim 1, wherein the identifier that specifies the printing apparatus is described in a body of the received electronic mail.

5. An information processing apparatus according to claim 1, wherein the identifier that specifies the printing apparatus includes a name of the printing apparatus.

6. An information processing apparatus according to claim 1, wherein the identifying unit identifies the printer driver to be used from among the plural printer drivers, each of which is different from each other, based on both the corresponding table stored in the storage unit and the identifier entered in the received electronic mail.

7. A control method for an information processing apparatus capable of communicating with at least one each of plural printing apparatuses, comprising:
    receiving an electronic mail with a file attached thereto, the electronic mail having at least one of respective identifiers of the plural printing apparatuses entered therein;
    storing a corresponding table in which the identifiers of the plural printing apparatuses are included, each of the identifiers of the plural printing apparatuses in the corresponding table being usable for identifying each of printer drivers for the plural printing apparatuses;
    identifying, based on the corresponding table stored in the storing and the identifier entered in the received electronic mail, a printer driver to be used;
    generating print data from a file attached to the received electronic mail using the identified printer driver;

sending the generated print data to the printing apparatus identified based on the identifier entered in the received electronic mail; and obtaining an identifier of a new printing apparatus different from the plural printing apparatuses to add the obtained identifier to the corresponding table for enabling the new printing apparatus to print a file attached to an electronic mail.

8. A control method for an information processing apparatus according to claim 7, wherein the identifying identifies the printer driver to be used from among the plural printer drivers, each of which is different from each other, based on both the corresponding table stored in the storing and the identifier entered in the received electronic mail.

9. An information processing system capable of communicating with each of plural printing apparatuses, comprising:
- a receiving unit configured to receive an electronic mail with a file attached thereto, the electronic mail having at least one of respective identifiers of the plural printing apparatuses entered therein;
- a storage unit configured to store a corresponding table in which the identifiers of the plural printing apparatuses are included, each of the identifiers of the plural printing apparatuses in the corresponding table being usable for identifying each of printer drivers for the plural printing apparatuses;
- an identifying unit configured to, based on both the corresponding table stored in the storage unit and the identifier entered in the received electronic mail, identify a printer driver to be used;
- a generation unit configured to generate print data from a file attached to the received electronic mail using the printer driver identified by the identifying unit;
- a sending unit configured to send the print data generated by the generation unit to the printing apparatus identified based on the identifier entered in the received electronic mail; and
- an additional unit configured to obtain an identifier of a new printing apparatus different from the plural printing apparatuses and add the obtained identifier to the corresponding table for enabling the new printing apparatus to print a file attached to an electronic mail.

10. An information processing system according to claim 9, further comprising a starting unit configured to start an application corresponding to an extension of the file attached to the received electronic mail, wherein based on the file processed using the application started by the starting unit, the generation unit generates the print data.

11. An information processing system according to claim 9, wherein the identifier that identifies the printing apparatus is described in a subject line of the received electronic mail.

12. An information processing system according to claim 9, wherein the identifier that identifies the printing apparatus is described in a body of the received electronic mail.

13. An information processing system according to claim 9, wherein the identifier that identifies the printing apparatus includes a name of the printing apparatus.

14. An information processing system according to claim 9, wherein the identifying unit identifies the printer driver to be used from among the plural printer drivers, each of which is different from each other, based on both the corresponding table stored in the storage unit and the identifier entered in the received electronic mail.

* * * * *